US009282191B2

(12) United States Patent
Cohen et al.

(10) Patent No.: US 9,282,191 B2
(45) Date of Patent: Mar. 8, 2016

(54) METHOD AND APPARATUS FOR CONFERENCING OF TEXT MESSAGES

(71) Applicant: PHONE.COM LLC, Livingston, NJ (US)

(72) Inventors: Alon Cohen, Tenafly, NJ (US); Brian Lee Scott, Poway, CA (US)

(*) Notice: Subject to any disclaimer, the term of this patent is extended or adjusted under 35 U.S.C. 154(b) by 0 days.

(21) Appl. No.: 14/013,340

(22) Filed: Aug. 29, 2013

(65) Prior Publication Data

US 2014/0073301 A1  Mar. 13, 2014

Related U.S. Application Data

(63) Continuation of application No. 13/108,494, filed on May 16, 2011, now Pat. No. 8,571,588.

(60) Provisional application No. 61/345,316, filed on May 17, 2010.

(51) Int. Cl.
| H04M 3/56 | (2006.01) |
| H04W 4/14 | (2009.01) |
| H04L 12/58 | (2006.01) |
| H04L 12/18 | (2006.01) |

(52) U.S. Cl.
CPC ............ H04M 3/56 (2013.01); H04L 12/189 (2013.01); H04L 12/5895 (2013.01); H04L 51/38 (2013.01); H04W 4/14 (2013.01); H04L 12/1822 (2013.01)

(58) Field of Classification Search
USPC ........................................................ 455/416
See application file for complete search history.

(56) References Cited

U.S. PATENT DOCUMENTS

| 6,856,809 | B2* | 2/2005 | Fostick | 455/466 |
| 7,330,540 | B2* | 2/2008 | Darby et al. | 379/202.01 |
| 8,238,949 | B1* | 8/2012 | Figarella et al. | 455/466 |
| 8,756,328 | B2* | 6/2014 | Guedalia et al. | 709/228 |
| 2002/0173319 | A1* | 11/2002 | Fostick | 455/466 |
| 2003/0072428 | A1* | 4/2003 | Stern et al. | 379/202.01 |
| 2004/0063432 | A1* | 4/2004 | Borsan | 455/445 |
| 2005/0044159 | A1* | 2/2005 | Niemi et al. | 709/207 |
| 2007/0026852 | A1* | 2/2007 | Logan et al. | 455/422.1 |
| 2007/0143397 | A1* | 6/2007 | Guedalia et al. | 709/203 |
| 2007/0276913 | A1* | 11/2007 | Olson et al. | 709/206 |
| 2008/0132215 | A1* | 6/2008 | Soderstrom et al. | 455/416 |
| 2009/0061825 | A1* | 3/2009 | Neelakantan et al. | 455/412.1 |
| 2010/0048191 | A1* | 2/2010 | Bender et al. | 455/416 |
| 2010/0216443 | A1* | 8/2010 | Jacobstein et al. | 455/416 |
| 2011/0045851 | A1* | 2/2011 | Maddox et al. | 455/466 |
| 2011/0206196 | A1* | 8/2011 | Isaacson et al. | 379/142.06 |

* cited by examiner

*Primary Examiner* — Jinsong Hu
*Assistant Examiner* — Jean Chang
(74) *Attorney, Agent, or Firm* — McCarter & English, LLP

(57) ABSTRACT

A system and method are provided which provide a text messaging conference among at least three users who communicate on different first communication channels. A message initiated by a first user is received on one of the first communication channels. The message seeks to initiate a text message conference and includes identities of a plurality of additional users to participate in the messaging conference. Conference participants are identified by a two part identifier, which allows a single participant to participate in multiple ongoing simultaneous conferences.

15 Claims, 3 Drawing Sheets

METHOD AND APPARATUS FOR CONFERENCING OF TEXT MESSAGES

RELATED APPLICATION

This application is a continuation of U.S. application Ser. No. 13/108,494, filed May 16, 2011, which claims the benefit of U.S. Provisional application No. 61/345,316, filed on May 17, 2010. The contents of the '316 application and the '494 application are incorporated by reference herein in their entirety, and the '316 application is also included herewith as an appendix.

BACKGROUND OF THE INVENTION

The present invention relates generally to text messaging, such as Short Message Service (SMS) text messaging and, more particularly, concerns a method and apparatus for achieving conferencing of text messages, and related message formats.

Today, text messaging is one of the most widely used data applications in the world and is familiar to virtually every mobile telephone user. The most common text messaging technology, SMS, was originally developed for the Global System for Mobile Communications (GSM) series of standards, but today it is available in every mobile telephone system, as well as satellite and landline systems, such as the public service telephone network. (PSTN).

SMS text messages are transported by the signaling paths needed to control telephone traffic ("out of band"), rather than with the voice traffic itself, during intervals when no signaling traffic exists. As a result, SMS is implemented in practically every mobile station and end point available. Additionally, because SMS typically uses the call setup path, the messages may be transmitted substantially instantaneously, and out of band, without occupying significant media path bandwidth on the network.

Despite the huge popularity of SMS with the public, it has not been successful in a conferencing environment, particularly, one involving interactive communications among groups of users (few-to-few users) or one-to-few users in a controlled group. Although modern SMS clients, such as the iPhone®, can send a one-to-few message, the recipients do not have any indication that they need to respond to multiple parties. Therefore, there exists a substantial need in the art for effective conferencing in text messaging, such as SMS, communications.

BRIEF SUMMARY OF THE INVENTION

In accordance with one aspect of the present invention a system and method are provided to implement a text messaging conference among at least three users who communicate on different first communication channels. A conference is initiated with a message from a first user, which is received on one of the first communication channels, and commands the initiation of a text message conference. This message includes identities of a plurality of users to participate in the messaging conference. A second set of conferencing communication channels, which are not the first communication channel, are then dedicating to each conference participant, and the first user and additional users communicate messages over the new conferencing communication channels. A message received over one of the said second conferencing communication channels from one of the users is forwarded to the other users participating in the messaging conference via their respective communication channels.

In a preferred embodiment, the conferencing communication group is a logic group constructed by associated plural members of the conference together in a table stored at the conference bridge. Each member of the conference is preferably identified by a combination of two numbers, a first being a number associated with the user's mobile or other telephony or communications device, and a second number being associated with a Direct inward Dial ("DID") line associated with the conference bridge. Even for a particular conference, the DID numbers which form part of the identity of each participant may be the same or different, and a user's mobile device can also preferably participate in plural SMS conferences because a user can have multiple said DID identifiers—each pair of the device number and said DID, is formed by combining the telephony or communications device number with a different DID number. Each of said pairs is associated with a specific group of conference participants.

BRIEF DESCRIPTION OF THE DRAWINGS

The foregoing brief description and further objects, features and advantages of the present invention will be understood more completely from the following detailed description of a presently preferred, but nonetheless illustrative, embodiment in accordance with the present invention, with reference to add to the accompanying drawings, in which.

DETAILED DESCRIPTION OF THE PREFERRED EMBODIMENT

Figure 1:
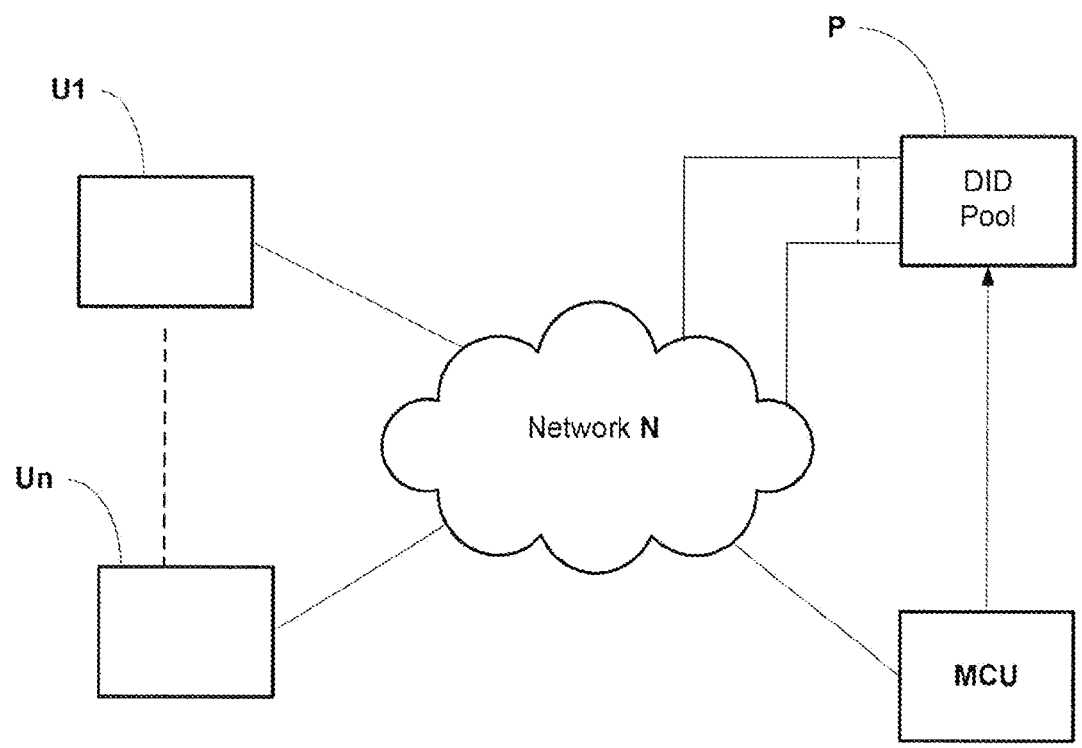
FIG. 1 is a functional block diagram illustrating the environment in which the present invention is utilized.

Turning now to the drawings, FIG. 1 is a functional block diagram illustrating the environment in which the present invention is utilized. In FIG. 1, network N represents the combination of all networks capable of accommodating SMS communications. A plurality of users operating communication devices U1 . . . Un (e.g. SMS capable end-points) are connected to network N, as is a Multiple Conferencing Unit MCU. A user U1 wishing to initiate an SMS conference sends a text message to a predefined telephone number to reach the unit MCU. In his message, he indicates the intent to set up an SMS conference (essentially as a system or textual command) and specifies the intended participants in the conference. As a practical matter, a user U1 may set up the conference through the contacts list on his communication device, which will insert his own name, a telephone number and name for each of the intended participants to form the said system command. Unit MCU associates a logical identifier with the conference and assigns one or more telephone numbers to the conference from a pool of direct-in-dialed (DID) telephone lines associated with the conference bridge and which the bridge controls.

To set up the conference channel, a table of numbers is stored. For each intended participant, the bridge forms a unique identifier that includes preferably a combination of at least two numbers, one DID number from the pool of DID numbers associated with the conference bridge, and the other number being the telephone number of the communications device of the participant. Each said identifier is thus comprised of at least two parts, and a set of identifiers is then logically grouped by the bridge as a single conference.

By utilizing the foregoing technique of assigning two part identifiers to each communications device, each communications device can participate in multiple conferences at the same time. That is, at a given point in time, the bridge might have two or more different identifiers associated with the same communications device. Each of the identifiers would be the same for the portion of the identifier that represents the telephone number of the communications device, but would be different for the bridge DID portion. This results in a situation where communications coming from the communications device but on different DID numbers into the bridge get associated with different conferences.

Returning to the process of setting up the conference channel, once the two part identifiers are assigned to each proposed conference participant, Unit MCU then communicates with the intended participants using the second part of said identifier (i.e the DID selected from the pool), provides them with details of the conference, preferably the originator's and participants' names and preferably obtains their agreement to participate in the conference, through the DID number to which that participant's SMS messages will be sent.

In either event, all conference participants are placed into a table, and future SMS messages received are then transmitted to the group and only to consenting members if consent was required by the users. Notably, due to the two part identifier system described above, the group to which the two part messages are sent will depend upon both the DID number at which it arrives at the conference bridge, as well as the number of the device from which it arrives. This system thus allows the same communications device to participate simultaneously in multiple SMS conferences.

Figure 2:
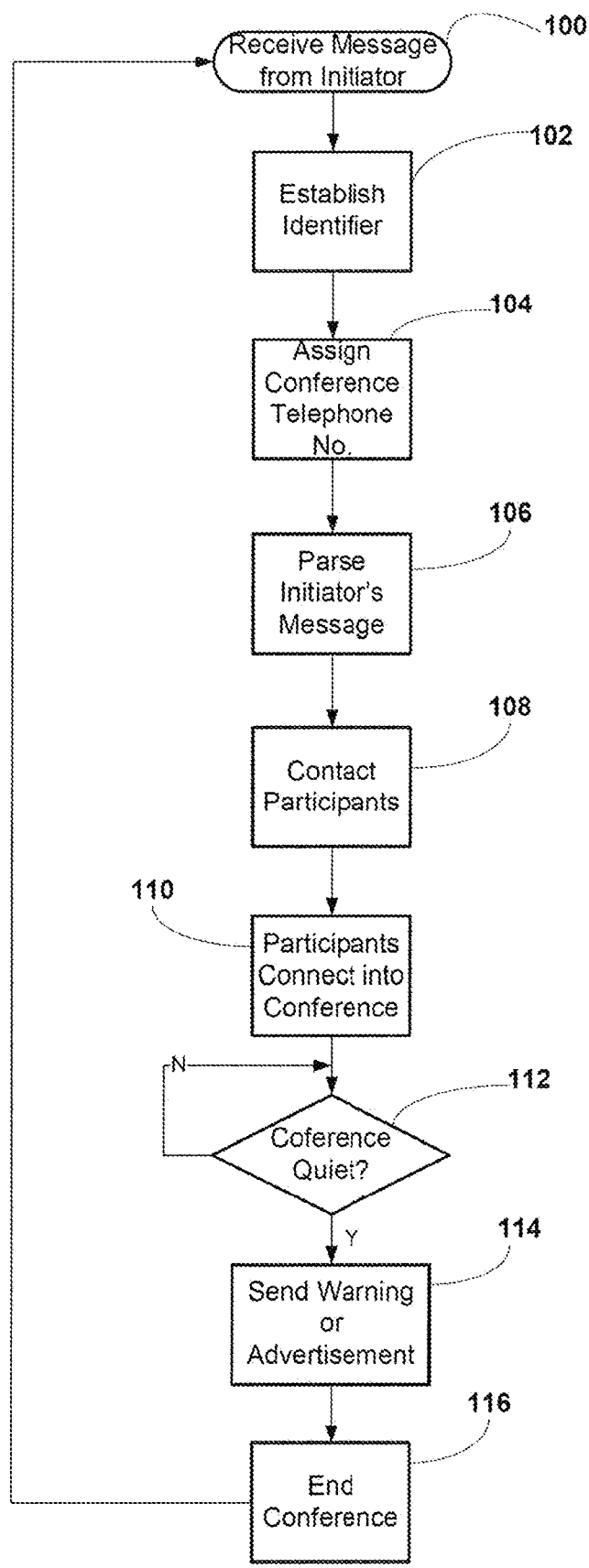
FIG. 2 is a flowchart illustrating the operation of Multiple Conferencing Unit MCU.

FIG. 2 is a flowchart illustrating the operation of Multiple Conferencing Unit MCU as shown in FIG. 1. Operation begins at block 100, when unit MCU receives a message from an initiating user, requesting the establishment of an SMS conference. At block 102, the unit creates a logical identifier for the conference and, at block 104, the unit reserves a conference telephone number from among available DID telephone numbers available in its pool. Unit MCU then parses the initiating user's message to extract the names and telephone numbers of participants (block 106).

At block 108, unit MCU sends a text message to each intended participant, at the supplied telephone number, inviting him to the conference and providing him with the conference telephone number using the specific caller ID from the pool of DIDs that composed the said unique paired identifier set for each participant and conference. Each participant can then send text messages to that said caller ID number (block 110), and unit MCU sends received text messages to each other participant at his supplied telephone number, allowing each participant to be a part of the conference. Again, it is noted that the conference telephone number supplied to each conference participant may be different from the others. The MCU bridge will know that messages coming from a particular mobile device, on a particular conference DID number, are associated with a specific conference and with specific other conference participants, regardless of the fact that such other conference participants may send messages for that same conference to the MCU on a different DID number.

At block 112, a test is performed to determine if the conference line has been quiet (i.e., no text message traffic) for a predetermined time T1. If so, a warning message is sent to all participants that the conference will terminate after an additional time T2, if there are no further messages. At block 116, the conference terminates (under the assumption that the line remained quiet (had it not, the conference would have continued), and control reverts to block 100, to await the next request by an initiator for conference. The termination of the conference enables some DID numbers to be returned to the pool to be reused with the same participants which enables to keep operating cost down in case the service is a free service. However, an MCU operator can choose to use the MCU without the termination option and maintain persistent conferences for as long as the creators of the conferences did not command the bridge to delete a conference.

From the preceding description, it will be appreciated that the embodiment of unit MCU described thus far can receive two types of messages from participants: a message from the initiating participant requesting initiation of the conference; and text or content messages from participants. Unit MCU, as explained, responds to a conference initiation request message by parsing it to ascertain the requested participants, and it responds to a content message by forwarding it to plural participants. It is contemplated that unit MCU also be capable of receiving command messages from at least the initiating participant, to which it responds by altering the parameters of an existing conference. Some commands which might be used could include: "add", to add a participant; "kick" to drop a participant from the conference; "list", to list all the participants and their participation acceptance status; "mute", to prevent one or more participants from sending messages, "help" to get instructions on all the available commands, and "un-mute"; "pause" to pause and store messages for later delivery to a participant, "continue" to receive all stored messages for the group and get back on the bridge live messages.

The command messages permissible from each participant may vary among the participants. For example, perhaps only the conference initiator will have the authority to alter certain conference parameters or drop one or more participants, whereas the MCU will ignore such message if received from another participant. Alternatively, the MCU could act on a particular command message if received from one or more specified participants, but if received from others of said participants, the MCU could respond to such participant with a message indicating such participant is not authorized to issue such command.

Messages might have shortcuts for fast operations for instance continue, can become "cont" or any other defined shortcut. That is, the SMS messages are transmitted to all participants of the previously established logical group, except if such message is of a particular type which is known by the MCU to be a command, usually related to changing parameters or affecting behavior of an existing SMS conference.

Figure 3:
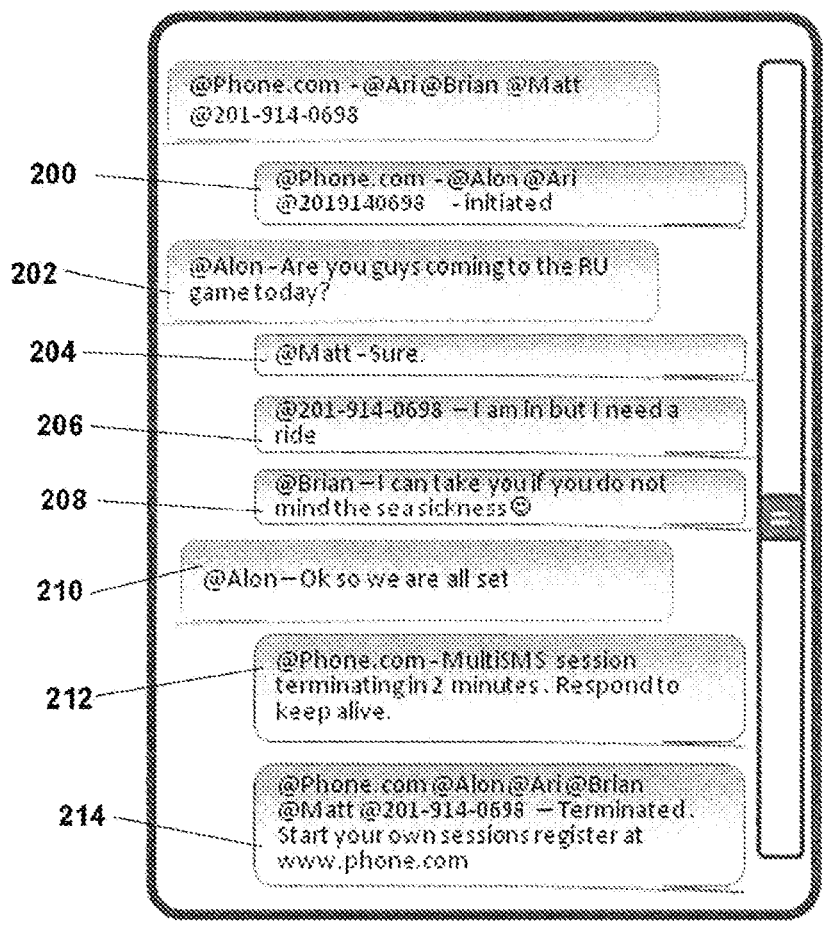
FIG. 3 is a representation of how a text conference would appear to the participants.

FIG. 3 is a representation of how a text conference might appear to the participants in a preferred embodiment of the invention. In the figure, participants' names are indicated with an initial "@" symbol, however other representations from icons or symbols to simple "Name:" format might be another acceptable way to present the message sender name. "Phone.com" is the system provider of the conferencing service, while the initiator is "Alon", and the remaining participants are "Ari", "Brian", "Matt" and a telephone number "201-914-0698." In one embodiment the conference is initiated at block 200 using twitter formatted names later translated to phone number by an address book on the server. However in another embodiment a message such as "Alon Ari 2019140698 Brian 2015556767 Matt 2015678899" could be sent to the bridge denoting the initiator name, and the participants' names and respective phone number, in this embodiment the server needs no prior knowledge of the participants' phone numbers. The server responds back at 200, and the initial text message appears at block 202. Thereafter, there are responsive messages at blocks 204-208, and a further message from Alon at block 210. A session termination warning appears at block 212, and the session actually terminates at block 214. As can be seen, the initial participant indicated in each message (e.g. "@Brian" at 208) is the sender (system "@Phone.com" is treated like a participant.).

In a preferred embodiment, messages send from the MCU itself, and/or command messages may appear in a separate thread from the actual media messages such as the SMS texts that form the conference itself.

It is noted that the conference need not be set up via an SMS message, but could be set up using online application, call-in number, etc. It can also be initiated in steps where participants are added one by one and interactively where the MCU asks questions and wait a response from the user. Also, even during the time content is exchanged on the conference, it is not necessary that all participants be using the same SMS messaging to participate in the conference. It is possible some may receive their messages via email, for example. This could be implemented by, for example, having the participant specify as part of his acceptance to the conference that he wished to participate by email, not SMS. In such a case, the MCU would know that of all the participants in conference table stored at the bridge as the logical conference channel, transmissions to and from certain specific participants would be via email, and the appropriate conversions accomplished before forwarding the messages.

Additionally, although multiple conferees are discussed above, the system can be used with only two conferees in a manner that actually will disguise the phone number of a user if desired. More specifically, a user can make a call or send an SMS message to a destination party via the MCU from his mobile device. In response, the MCU will substitute an available DID number for the user's mobile number into the DID field before sending the call to the destination party. If the destination party returns a call or reply with a text message to the caller ID received from the system, that party will call the assigned MCU number, which will forward the call or message to the original user, optionally without any substitution of caller ID, or with substitution of the DID to a number from the DID pool of the MCU so that when the initiator reply back to said assigned number from the pool the call or message will go through the MCU and will continue to hide the originator device caller ID, when said return substitution happen the name or original caller ID of the original destination party is appended to the text message so the originator will be able to tell where the text came from. In this fashion a user of the system can disguise between callers. Additionally, the MCU can be configured with user initiated commands to process incoming calls to the original user differently. For example, calls at certain times of day or from certain users can be forwarded to voicemail, while other incoming calls to the assigned DID number can be forwarded to the user's mobile phone. Other variations in processing based upon call parameters are possible as well. When originating a call or text the MCU creates a database record composed of a pool-DID number, the originator device DID number, the destination number and the originator defined outbound DID number (if such combination does not exist). When a call or text comes in to a pool DID number from the destination number, the bridge compares the said destination number, the pool DID number and fetches the originator phone number associated with it so the call or text can be routed to the originator number. In this fashion a finite relatively small pool of DID numbers can serve infinite number of users since every user needs no more numbers than the maximal number of numbers he/she normally dials to, and the same pool can overlap between different users.

Although a preferred embodiment of the invention has been disclosed for illustrative purposes, those skilled in the art will appreciate that many additions, modifications and substitutions are possible, without departing from the scope and spirit of the invention as defined by the accompanying claims.

What is claimed:

1. A method of establishing a first conference amongst at least three users comprising:
   receiving, at a bridge, an out of band and substantially instantaneous message initiated by a first user, said message including more than one user identities, said bridge including one or more incoming physical or logical communications channels;
   assigning a unique logical identifier to each user associated with said more than one user identities, and to said first user, said unique logical identifier including an actual phone number associated with said each user or said first user and a Direct inward Dial (DID) phone number from a pool of DID numbers associated with the bridge;
   forming a first group of users from said unique logical identifiers for the at least three users; and
   transmitting subsequent substantially instantaneous out of band messages received from any user associated with said first group to all or a subset of other such users associated with said first group, said messages being transmitted out of band and substantially instantaneous, wherein said Direct inward Dial (DID) phone number that is assigned for said first user or said each user is capable of being different than one or more Direct inward Dial (DID) phone numbers assigned to other users within said first group of users, and wherein the unique logical identifier for the first user and said each user uniquely identifies the first user and said each user as participants in the first conference.

2. The method of claim 1, wherein, upon said first user or said each user initiating a second conference having a second group of users, said first user or said each user can be assigned a second Direct inward Dial (DID) phone number for said second conference that is distinct from said Direct inward Dial (DID) phone number that was assigned for that same user for said first conference.

3. The method of claim 2, said one or more physical or logical communication channels to which said users in said first group send said substantially instantaneous out of band messages are different for different users associated with said first group.

4. The method of claim 3, wherein said substantially instantaneous out of band messages are Short Message Service (SMS) messages.

5. The method of claim 4, wherein said bridge, upon receipt of said substantially instantaneous out of band messages, examine said messages to determine if said messages are a bridge command, and if so, processes said messages in a first manner, and if not, processes said messages in a second manner.

6. The method of claim 1, wherein said one or more physical or logical communication channels to which said users in said first group send said substantially instantaneous out of band messages are different for different users associated with said first group.

7. The method of claim 6, wherein said substantially instantaneous out of band messages are Short Message Service (SMS) messages.

8. The method of claim 7, wherein said bridge, upon receipt of said substantially instantaneous out of band messages, examine said messages to determine if said messages are a bridge command, and if so, processes said messages in a first manner, and if not, processes said messages in a second manner.

9. The method of claim 7, further comprising:
classifying each of said Short Message Service (SMS) messages into one of three types, said three types being an initiation message, a content message, or a command message,
if a message of said Short Message Service (SMS) messages is an initiation message, parsing said message to ascertain said each user associated with said more than one user identities,
if a message of said Short Message Service (SMS) messages is a content message, forwarding said message to one or more of said each user associated with said more than one user identities and said first user, and
if a message of said Short Message Service (SMS) messages is a command message, altering parameters of said conference.

10. The method of claim 1, further comprising monitoring frequency at which messages are received or sent on a specific channel associated with a user, and terminating said user from said group if said frequency exceeds a predetermined threshold.

11. A multiconferencing system for establishing a conference amongst at least three users comprising:
(a) a bridge including one or more incoming physical or logical communications channels for receiving an out of band and substantially instantaneous message initiated by a first user, said message including more than one user identities, and outputting a unique logical identifier for said first user and said each user associated with said more than one user identities;
(b) a Multiple Conferencing Unit (MCU) in communication with the bridge to receive and group the logical identifiers, said unique logical identifiers including a first indicia of an actual phone number associated with said first user or said each user associated with said more than one user identities and a second indicia of a Direct inward Dial (DID) phone number from a pool of DID numbers associated with the bridge, wherein the second indicia of the Direct inward Dial (DID) phone number that is assigned for said first user and said each user associated with said more than one user identities within a first group is capable of being different than one or more of the second indicia of the Direct inward Dial (DID) phone numbers assigned to other users within said first group, and wherein said unique logical identifier for the first user and said each user uniquely identifies the first user and said each user as participants in a particular conference; and
(c) a transmitter to transmit said substantially instantaneous message initiated by the first user to all or a subset of said each user associated with said more than one user identities, said transmitter transmission being out of band and substantially instantaneous.

12. The system of claim 11, wherein said out of band and substantially instantaneous message is a Short Message Service (SMS) message.

13. A method of establishing a first conference comprising:
receiving, at a bridge, an out of band and substantially instantaneous message initiated by a first user, said message including one or more user identities, said bridge including one or more incoming physical or logical communications channels;
in response to the receiving of the message, determining whether a unique logical identifier needs to be assigned for that first user and said user identities, and, if said assignment is required, assigning a unique logical identifier to each user associated with said user identities, and to said first user, said unique logical identifier including an actual phone number associated with said each user or said first user and a Direct inward Dial (DID) phone number from a pool of DID numbers associated with the bridge;
forming a first group of users from said unique logical identifiers; and
transmitting subsequent substantially instantaneous out of band messages received from any user associated with said first group to all or a subset of other such users associated with said first group, said messages being transmitted out of band and substantially instantaneous, wherein said Direct inward Dial (DID) phone number that is assigned for said first user or said each user is capable of being different than one or more Direct inward Dial (DID) phone numbers assigned to other users within said first group of users, and wherein the unique logical identifier for the first user and said each user uniquely identifies the first user and said each user as participants in the first conference.

14. A method of establishing a phone call comprising:
receiving, at a bridge, an out of band and substantially instantaneous message initiated by a first user, said message including a destination identity, said bridge including one or more incoming physical or logical communications channels;
in response to the receiving of the message, determining whether a unique logical identifier needs to be assigned for that first user, and said destination identity, if said assignment is required, assigning a unique logical identifier to said first user associated with said destination identity, said unique logical identifier including an actual phone number associated with said first user and a Direct inward Dial (DID) phone number from a pool of DID numbers associated with the bridge;
wherein said Direct inward Dial (DID) phone number that is assigned for said first user is capable of being the same as one or more Direct inward Dial (DID) phone numbers assigned to other users associated with the same said destination identity, and yet is unique for said first user, wherein the unique logical identifier for the first user and said destination identity uniquely identifies said first user and said destination identity as participants in the phone call.

15. The method of claim 14, wherein said destination identity is a phone number (DID) and where first user is identified by its caller ID.

* * * * *